(12) United States Patent
Ino et al.

(10) Patent No.: US 10,230,086 B2
(45) Date of Patent: Mar. 12, 2019

(54) SEPARATOR

(71) Applicant: NIPPON SHEET GLASS COMPANY, LIMITED, Tokyo (JP)

(72) Inventors: Juichi Ino, Matsusaka (JP); Atsushi Asada, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1286 days.

(21) Appl. No.: 13/710,752

(22) Filed: Dec. 11, 2012

(65) Prior Publication Data

US 2013/0157109 A1 Jun. 20, 2013

(30) Foreign Application Priority Data

Dec. 16, 2011 (JP) ................................. 2011-275612

(51) Int. Cl.
*H01M 2/16* (2006.01)
*H01M 2/14* (2006.01)

(52) U.S. Cl.
CPC ......... *H01M 2/1606* (2013.01); *H01M 2/145* (2013.01); *H01M 2/164* (2013.01)

(58) Field of Classification Search
CPC ..... H01M 2/145; H01M 2/1606; H01M 2/164
USPC .................................................. 429/145, 144
See application file for complete search history.

(56) References Cited

U.S. PATENT DOCUMENTS

| | | | | |
|---|---|---|---|---|
| 4,294,899 A * | 10/1981 | Witherspoon | ................ | 429/206 |
| 2006/0134526 A1 * | 6/2006 | Han et al. | ..................... | 429/251 |
| 2007/0292673 A1 | 12/2007 | Katagiri et al. | | |
| 2008/0138697 A1 * | 6/2008 | Asada | ................... | C03C 14/002 429/479 |
| 2011/0003209 A1 * | 1/2011 | Katayama | ........... | H01M 2/1606 429/246 |
| 2011/0039145 A1 * | 2/2011 | Abe | ..................... | H01M 2/1666 429/144 |
| 2011/0244335 A1 * | 10/2011 | Ino | ..................... | H01M 2/1646 429/246 |

FOREIGN PATENT DOCUMENTS

| | | |
|---|---|---|
| EP | 1816258 | 8/2007 |
| JP | 2002-298816 A | 10/2002 |
| JP | 2004047450 A * | 2/2004 |

(Continued)

OTHER PUBLICATIONS

R Haggland "Analysis of localized failure in low-basis-weight paper", International Journal of Solids and Structures vol. 43, Issues 18-19, Sep. 2006, pp. 5581-5592.*

(Continued)

*Primary Examiner* — Cynthia H Kelly
*Assistant Examiner* — Rashid A Alam
(74) *Attorney, Agent, or Firm* — Kratz, Quintos & Hanson, LLP

(57) ABSTRACT

The present invention provides an inexpensive separator having excellent heat resistance and causing no contraction even in a high temperature circumstance nor short circuit while maintaining a high porosity. This separator is characterized in that the flat surfaces of scaly particles are oriented in the extending direction of the surface of the separator, the scaly particles being arranged in layers in the thickness direction of the separator, and fibrous materials are interposed among the scaly particles.

7 Claims, 1 Drawing Sheet

(56) References Cited

FOREIGN PATENT DOCUMENTS

JP  WO 2008029922 A1 * 3/2008 .......... H01M 2/1606
WO     2006/057240 A1    6/2006

OTHER PUBLICATIONS http://www.fibrelab.ubc.ca/files/2012/07/PPC-Handsheet-Making-Manual-Rev-2.pdf, access date: May 18, 2016.*
English translation of Nagakuba (JP 2002-298816), Oct. 2002, Japan.*
English translation of Ino, JP 2004-047450, Feb. 2004, Japan.*
And http://www.fibrelab.ubc.ca/files/2012/07/PPC-Handsheet-Making-Manual-Rev-2.pdf).*
Extended European Search Report dated Apr. 11, 2013 in counterpart application No. 12196211.2 (6 pages).
Japanese Office Action dated Feb. 17, 2015 with partial English translation.

* cited by examiner

SEPARATOR

CROSS-REFERENCE TO RELATED APPLICATIONS

This application is based upon and claims the benefit of priority of the earlier filed Japanese Patent Application No. 2011-275612 filed on Dec. 16, 2011, the entire contents of which are incorporated herein by reference.

BACKGROUND OF THE INVENTION

Field of the Invention

Lithium ion batteries, which are a kind of nonaqueous batteries, are broadly used as power sources of portable devices such as a cellular phone and a notebook personal computer owing to characteristics of high energy density. The achievement of higher performance of the portable devices tends to further increase the capacity of the lithium ion batteries, and it is therefore important to ensure safety.

In the currently used lithium ion batteries, what is used as a separator interposed between a positive electrode and a negative electrode is, for example, a polyolefin porous film having a thickness of about 20 to 30 μm. As material for the separator, polyethylene with a low melting point is applied to block pores by melting a constituent resin of the separator at a temperature not higher than a thermal runaway temperature of a battery. The internal resistance of the battery is thereby increased to ensure a shut-down effect of improving the safety of the battery in the case of a short circuit or the like.

An example of a film used for such a separator is a uniaxially or biaxially oriented film for achieving porosity and improving strength. This kind of separator has strain caused by the orientation in the film, which leads to a problem of contraction caused by residual stress when exposed to a high temperature. There is therefore a danger of ignition for such reasons that a current cannot be immediately cut off due to pores which are not sufficiently blocked and that a positive electrode and a negative electrode are directly short-circuited due to the contraction.

As a technique for preventing a short circuit of a battery due to thermal contraction of a separator, there is, for example, a method of using, as a separator, a microporous film using heat-resistant resin. However, this kind of separator has a disadvantage of high cost.

On the other hand, a technique of applying various processing to a nonwoven fabric formed of a low cost material and using it for a separator is also proposed. For example, JP-A-2003-123728 (Patent Document 1) and JP-A-2007-317675 (Patent Document 2) disclose a nonwoven fabric made by a wet papermaking process using polyester fiber, and JP-A-2006-19191 (Patent Document 3) discloses a nonwoven fabric using polyester fiber mixed with aramid fiber which is heat-resistant fiber. However, they are not practical because the pore size is large and an internal short circuit occurs.

In order to prevent this problem, JP-A-2003-22843 (Patent Document 4) discloses a method of using a PP nonwoven fabric in which inorganic fine particles or organic fine particles are mixed, and JP-T-2005-536658 (Patent Document 5) discloses a method of using a polyethylene terephthalate (PET) nonwoven fabric to which inorganic fine particles are applied.

However, in the technique of mixing inorganic fine particles in a nonwoven fabric, it is difficult to completely prevent a short circuit caused by the occurrence of lithium dendrite unless the pores in the nonwoven fabric are uniformly and densely filled with the inorganic fine particles. It is difficult to uniformly fill inorganic fine particles in a base material with a large degree of nonuniformity such as a nonwoven fabric, and even if the filling is densely made, there is a problem of resulting in low porosity and high resistance. On the other hand, in the case of reducing filling density of inorganic fine particles to ensure the porosity, there are problems that puncture resistance becomes low and that a short circuit is liable to occur in the case of the occurrence of dendrite.

JP-A-2005-339938 (Patent Document 6) sets thermal contraction of a polyolefin porous film separator as one of problems to be solved and proposes a technique of constituting a battery by forming a porous film including an inorganic oxide filler and a binder containing scaly silica, on the surface of a positive or negative electrode and by using this structure with the porous film separator as described above.

In the technique described in JP-A-2005-339938 (Patent Document 6), however, it is difficult to shorten a distance between the positive and negative electrodes because the above porous film is interposed along with a separator between the positive and negative electrodes. It is therefore difficult to avoid deterioration of the energy density of the battery.

In order to solve this problem, JP-A-2008-66094 (Patent Document 7) discloses a separator in which inorganic particles of 15 μm or less, more preferably 1 μm or less, such as scaly silica particles with an average particle diameter of 0.5 and silica particles with an average particle diameter of 3 μm, which are not substantially deformed at 150° C., are filled in pores of a nonwoven fabric such as a polyester nonwoven fabric which is not substantially deformed at 150° C.

However, there are the following problems in the above-mentioned related arts.
1) A Short Circuit is Liable to Occur in the Case of Using the Related Arts in a Battery Separator.

When there are scaly particles in the pores of a sheet-like material including fibrous materials, the particles exist in the pores in the mutually superimposed state, and when the existing amount is small, for example, when the amount of the scaly particles in a separator is less than 30 vol. % to the total volume of components in the separator, strength in a thickness direction becomes weak, which leads to the easy occurrence of a short circuit.

Further, when the average particle diameter of the scaly particles is less than 15 small particles gather to form film shape in the pores of the sheet-like material. In this case, when force is applied to the film in the thickness direction, particles are easily separated from each other, and strength in a thickness direction becomes weak. This is another reason for the easy occurrence of a short circuit.
2) Resistance as a Separator Increases.

When the porosity of a separator is less than 70%, an ion conduction path decreases, and the resistance of the separator increases. On the other hand, if the porosity exceeds 95%, the strength of a sheet-like material becomes weak, and the material is inappropriate as a separator.

Further, when there are scaly particles in the pores of the sheet-like material including fibrous materials, the particles exist in the pores in the mutually superimposed state to form film shape, which makes it difficult for ions to move especially in the film thickness direction.

SUMMARY OF THE INVENTION

The present invention has been achieved by focusing on the above-mentioned conventional problems, and the invention provides an inexpensive separator having excellent heat resistance and causing no contraction even in a high temperature circumstance nor short circuit while maintaining a high porosity.

For the purpose of solving the above problems, in a first aspect of the present invention, a separator is formed to orient the flat surfaces of scaly particles in the extending direction of the surface of the separator, to arrange the scaly particles in layers in the thickness direction of the separator, and to interpose fibrous materials among the scaly particles.

In a second aspect of the present invention, the average particle diameter of the scaly particles in the separator is 15 μm or more and 200 μm or less.

In a third aspect of the present invention, the porosity of the separator is 70% or more and 95% or less.

In a fourth aspect of the present invention, the amount of the scaly particles in the separator is 30 vol. % or more and 90 vol. % or less to the total volume of components in the separator.

According to the present invention, the flat surfaces (the wide-side surfaces) of scaly particles are oriented in the extending direction of the surface of the separator, the scaly particles are arranged in layers in the thickness direction of the separator, and fibrous materials are interposed among the scaly particles. The scaly particles and the fibrous materials thereby form an integrated structure, and resistance can be lowered while increasing puncture resistance. As a result, it is possible to provide the separator further improved in puncture resistance while maintaining low resistance.

DESCRIPTION OF THE EMBODIMENTS

Figure 1:
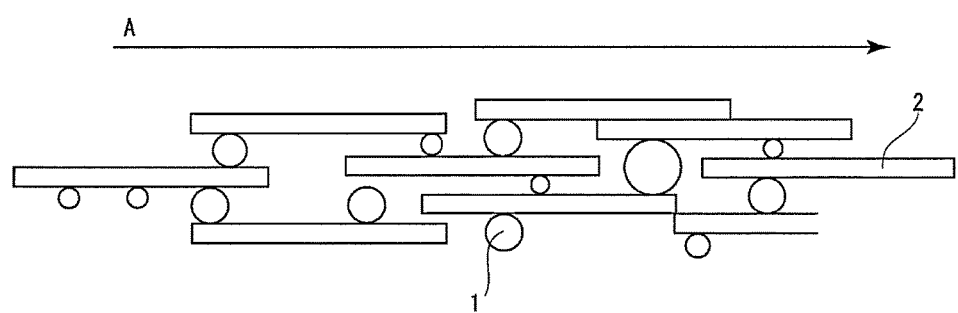
FIG. 1 is a schematic diagram of the cross section of the separator in the present invention.

As described in the above solutions, the present invention has the fibrous materials arranged among the scaly particles arranged in layers. The pores among the scaly particles can be ensured with fibers by arranging the fibrous materials among the scaly particles. Further, the scaly particles and the fibrous materials form the integrated structure, and resistance can be lowered while increasing puncture resistance. Many scaly particles can thereby be arranged for the purpose of increasing puncture resistance while maintaining low resistance.

In the case of filling the scaly particles in the pores of a sheet-like material including the fibrous materials, the pores are blocked with the scaly particles, and a defect of increasing resistance occurs. Further, there is no bond with a nonwoven fabric or the like which includes the fibrous materials, due to the presence of the scaly particles in the pores, and even if the sheet-like material is reinforced with a binder or the like, there is a problem of breakage in the thickness direction, that is, a problem that the puncture resistance becomes low.

With respect to the "fibrous materials" used in the present invention, there is no particular limitation if the fibrous materials have electrical insulating property and electrochemical stability and if they are stable to a nonaqueous electrolyte described below in detail (hereinafter may be referred to as an "electrolyte") and to a solvent used for a liquid composition containing the scaly particles used in producing the separator. The "fibrous materials" mentioned in this specification have an aspect ratio [length in the longitudinal direction/width in the direction orthogonal to the longitudinal direction (diameter)] of 10 or more. The above-mentioned "electrochemical stability" means that there is no chemical change in the fibrous materials when charging and discharging a battery.

Specific examples of a constituent material for the fibrous materials can be resin such as cellulose, modified cellulose (such as carboxymethylcellulose), polypropylene (PP), polyester [such as polyethylene terephthalate (PET), polyethylene naphthalate (PEN), and polybutylene terephthalate (PST)], polyacrylonitrile (PAN), polyvinyl alcohol (PVA), polyaramide, polyamide-imide, and polyimide; and an inorganic material (inorganic oxides) such as glass, alumina, and silica. The fibrous materials may contain one kind or two or more kinds of these constituent materials. In view of heat resistance and noncombustibility, the fibrous materials are preferably an inorganic material, and the fibrous materials are preferably thin fibers (1 μm or less) with a large aspect ratio in the case of using them in a nonwoven fabric, and are most preferably glass.

The diameter of the fibrous materials requires to be equal to or less than the thickness of an objective separator, preferably 0.1 to 5 μm, for example. If the diameter is too large, the mutual entanglement of the fibrous materials is insufficient, and the strength of the formed nonwoven fabric, that is, the strength of the separator becomes weak, which makes its handling difficult. If the diameter is too small, production of fibers becomes difficult and expensive. There is also a concern about a safety problem as well as an asbestos problem.

In order to ensure the pores with the fibrous materials, the ratio of the fibrous materials in the total volume of the components in the separator is preferably set to 10 vol. % or more and 70 vol. % or less, and in order to exhibit the effect of the scaly particles, the ratio is more preferably set to 20 vol. % or more and 60 vol. % or less.

It is preferable that the scaly particles have electrical insulating property and electrochemical stability and be stable to the electrolyte described below and to a solvent used for a liquid composition used in producing the separator, and the scaly particles are preferably inorganic particles in consideration of heat resistance and noncombustibility. The scaly particles may be porous.

In the present invention, it is preferable to use scaly particles with an average particle diameter of 15 μm or more and 200 μm or less because strength can be provided in the thickness direction of the separator by the scaly particles themselves, and as a result, a short circuit can be prevented. If the average particle diameter exceeds 200 μm, the surface of the separator becomes uneven to cause a defect by a worsened contact with electrodes when the separator is incorporated into the battery. If the average particle diameter is less than 15 μm, the particles enter the pores formed of the nonwoven fabric and no longer function as plate-like fillers laid among the fibers, which leads to weakness against breakage in the thickness direction, that is, leads to a structure of easily causing a short circuit.

It is preferable that the amount of the scaly particles in the separator be 30 vol. % or more and 90 vol. % or less to the total volume of the components in the separator. If the amount of the scaly particles in the separator is 30 vol. % or more to the total volume of the components in the separator, puncture resistance can be improved without increasing resistance, and the occurrence of dendrite can be more effectively suppressed. If the amount of the scaly particles in the separator exceeds 90 vol. % to the total volume of the components in the separator, there is a problem that the fibrous materials decrease, and the pores cannot be made among the scaly particles, which increases resistance. On the other hand, if the amount of the scaly particles is less than 30 vol. % to the total volume, the amount of the scaly particles in the thickness direction decreases, and strength in the thickness direction becomes weak, which leads to a problem that strength against a short circuit becomes weak.

The scaly particles are preferably glass because it is difficult to increase the particle diameter of scaly alumina or the like in terms of its producing method. The aspect ratio (the ratio of the maximum length and the thickness) of the scaly particles is preferably 5 or more and 1,000 or less, more preferably 15 or more and 100 or less.

Specific examples of the scaly particles can be substances derived from mineral resources, such as glass, $SiO_2$, $Al_2O_3$, $TiO_2$, $BaTiO_2$, $ZrO_2$, alumina-silica compound oxide, and oxide mica, or artificial materials thereof. In view of a producing method, it is more preferable to use glass from which particles having the particle diameter of 15 μm or more can be produced.

The scaly particles made from glass can be obtained by conventionally known methods. One of them is a method of inflating a molten glass base material like a balloon with gas supplied to a flow nozzle to form a hollow glass film and pulverizing the film by a pressing roll or the like. There is also a method of pouring a molten glass base material into a rotary cup, allowing particles to radially flow out of an upper edge part of the rotary cup by centrifugal force, and collecting the particles by a collector.

According to these methods, scaly particles made from glass with relatively large particle diameters (the thickness is 0.1 to 20 μm, and the average particle diameter is 1,000 μm or more) can be easily produced. Further, the scaly particles made from glass obtained by these methods can be pulverized to particles with appropriate particle diameters by a ball mill, a conical mill, a disk mill, a hammer mill, or the like.

The structure of the separator in the present invention is explained as follows, referring to FIG. 1. As shown in FIG. 1, fibrous materials 1 are arranged among scaly particles 2 (in the thickness direction of the separator), the wide-side surfaces of the particles being oriented in the extending direction of the front face or the rear face of the separator (in the direction shown by an arrow A). By producing the separator to have this structure, the scaly particles 2 are arranged to overlap with one another in part of the flat surfaces, and pores (through-holes) directed from one surface to the other surface in the separator are considered to be formed not in a straight line but in a bent form. Lithium dendrite can thereby be prevented from penetrating the separator, and the occurrence of a short circuit is estimated to be suppressed more satisfactorily.

In the present invention, the flat surface direction of the scaly particles 2 is oriented within a range of ±5 degrees based on the extending direction (A) of the surface of the separator. That is, it is configured that the flat surfaces of the scaly particles 2 are within ±5 degrees based on the surface of the separator.

In the separator of the present invention, it is preferable to use a binder for the purpose of binding the fibrous materials to one another and the scaly particles to one another or binding the materials and the particles with each other. The binder requires to have electrochemical stability, to be stable to an electrolyte, and to satisfactorily bind the fibrous materials, the scaly particles, and the like. Examples of the binder can be EVA (derived from vinyl acetate and having 20 to 35 mol % of a structural unit), an ethylene-acrylate copolymer such as an ethylene-ethyl acrylate copolymer, various rubber and derivatives thereof [such as styrene-butadiene rubber (SBR), fluororubber, urethane rubber, and ethylene-propylene-diene rubber (EPDM)], cellulose derivatives [such as carboxymethylcellulose (CMC), hydroxyethyl cellulose, and hydroxypropylcellulose], polyvinyl alcohol (PVA), polyvinyl butyral (PVB), polyvinyl pyrrolidone (PVP), polyurethane, epoxy resin, polyvinylidene fluoride (PVDF), a vinylidene fluoride-hexafluoropropylene copolymer (PVDF-HFP), and acrylic resin, which can be used independently or in combination of two kinds or more. These binders can be used by dissolving them in a solvent of a liquid composition for forming a separator, which is described below, or can be used in the form of a dispersed emulsion.

In the case of using the binder in the separator of the present invention, the amount of the binder in the total amount of the components of the separator is preferably 1 to 20 parts by weight if, for example, the amount of the components is 100 parts by weight.

In the case of adding a shut-down function to the separator, hot-melt particles or hot-melt fibers melting at 80 to 150° C. may be added unless the combining ratio of the scaly particles deviates from an appropriate range.

The porosity of the separator is preferably 70% or more and 95% or less. If the porosity of the separator is 70% or more, a large amount of electrolyte can be contained to increase the amount of lithium ions having the role of ionic conduction, which lowers resistance. If the porosity is more than 95%, the scaly particles and the fibrous materials forming the separator decrease, and a necessary strength cannot be kept. If the scaly particles are porous, the porosity in the scaly particles can be increased to also lead to an increase in the whole porosity in the separator, and when the amount of the porous scaly particles decreases so that the whole porosity of the separator is the same with that of the other separator, the separator with the decreased amount of the porous scaly particles can increase the filling amount of the scaly particles and the fibrous materials, and the strength can be improved. If the porosity of the separator is less than 70%, the amount of electrolyte decreases, that is, the amount of lithium ions having the role of ionic conduction decreases, which causes a problem of increasing resistance.

The separator can be produced by, for example, a method of uniformly dispersing the fibrous materials and the scaly particles in an organic solvent or water to obtain a slurry-like liquid composition which is applied to some sort of a substrate by using a conventionally well-known coating applicator such as a blade coater, a roll coater, a die coater, or a spray coater, and is peeled off after drying. However, since it is difficult to disperse the fibrous materials having a large aspect ratio, the most preferable method is to use a wet papermaking process to form a paper sheet by simultaneously using the fibrous materials, the scaly particles, and if necessary the binder. The use of the wet papermaking process allows the appropriate arrangement of the fibrous materials in the pores of the scaly particles. For the purpose of improving the strength of the separator, after the fibrous materials are appropriately arranged in the pores of the scaly particles, the binder may be applied by using the conventionally well-known coating applicator such as the blade coater, roll coater, die coater, or spray coater.

EXAMPLES

The following is an explanation of Examples in the present invention. Porosity of the separator, a volume ratio and an average particle diameter of the scaly particles were measured by the following methods.

a) Measurement of Thickness

The thickness of a sample was measured by a micrometer.

b) Porosity

The value of porosity VC can be obtained by the following equation 1 when a pressure of 20 kPa is applied to the sample to measure the thickness t by a dial gauge, the mass per unit area of the separator is set as W, each density of the scaly particles, the fibrous materials, the binder, or the like is set as $\rho M$, and the mass ratio of each of the solids thereof is set as cM.

$$VC(\%) = \{1 - W/t \times \Sigma(cM/\rho M)\} \times 100 \quad \text{[Equation 1]}$$

c) Volume Ratio of Scaly Particles in Separator

In the configuration of the present invention, the composition ratio of the scaly particles and particles of other forms or the fibrous materials is important. Therefore, the volume ratio of the scaly particles to the total volume of the fibrous materials, particulate substance and scaly particles except the binder in the separator was obtained as the volume ratio of the scaly particles in the separator. The volume ratio VF of the scaly particles can be obtained by the following equation 2 in the case of setting the density of the scaly particles as $\rho F1$, the mass ratio of the solids of the scaly particles as $cF1$, the density of the fibrous materials as $\rho F2$, the mass ratio of the fibrous materials as $cF2$, the true density of each of the other resin fiber and the particulate substance except the binder as $\rho P$, and the mass ratio thereof as $cP$.

$$VF(\%) = (cF1/\rho F1)/\{cF1/\rho F1 + cF2/\rho F2 + \Sigma(cP/\rho P)\} \times 100 \quad \text{[Equation 2]}$$

In the calculation, in each case of using, for example, glass, silica, and PET, the density thereof is 2.5 g/cm$^3$, 2.2 g/cm$^3$, and 1.38 g/cm$^3$ respectively.

d) Average Particle Diameter

The average particle diameter was measured by a laser diffraction type particle size distribution measuring apparatus (Microtrac II produced by Nikkiso), and a 50% particle diameter D50 of the particle diameter of the scaly particles (flaky glass) was set as the average particle diameter.

e) Puncture Resistance

Puncture resistance was measured by the following method. First, lithium cobaltate and natural spheroidal graphite, which are produced by Hohsen Corp., were prepared as a positive electrode and a negative electrode respectively. Second, a sample separator was held between the positive electrode and the negative electrode, and was horizontally placed on a flat metallic plate with the negative electrode facing downward. Further, a circuit tester was attached to the positive electrode and the negative electrode in order to confirm whether there was a short circuit. A separator was vertically pierced with a needle having a diameter of 3 mm from the upper side of the positive electrode, and when flowing of a current could be confirmed by the tester, the force applied to the needle was measured and set as puncture resistance.

f) Measurement of Electrical Resistance

Ni foil with a thickness of 30 μm which is punched out to have a diameter of 17 mm was used as an electrode. An HS cell produced by Hohsen Corp. was used as a cell for measurement. An obtained sheet was held between two sheets of the Ni foil, and after it was set in the HS cell, an electrolyte was injected. The electrolyte in use was obtained by dissolving 1 mol/L of LiPF$_6$ in a mixed solution of 30 vol. % of ethylene carbonate and 70 vol. % of dimethyl carbonate. The cell was sealed after injecting the electrolyte, and electrical resistance was measured using an impedance analyzer.

Example 1

Glass flakes were produced by a method of placing glass pellets having composition of C glass shown in Table 1, into a molten state, pouring molten glass pellets into a rotary cup, and allowing them to radially flow out of the cup. The obtained glass flakes were pulverized by a ball mill to obtain scaly particles made from glass fibers, having an average particle diameter of 20 μm and an average thickness of 0.4 μm.

TABLE 1

| Component | Composition of C glass (Mass %) | Composition of general C glass (Mass %) |
|---|---|---|
| SiO$_2$ | 65 | 63 to 72 |
| Al$_2$O$_3$ | 4 | 1 to 7 |
| CaO | 7 | 4 to 11 |
| MgO | 3 | 0 to 5 |
| B$_2$O$_3$ | 5 | 0 to 8 |
| R$_2$O | 12 | 9 to 19 |
| Fe$_2$O$_3$ | — | 0 to 0.2 |
| Li$_2$O | 0.5 | 0 to 1 |
| ZnO | 3.5 | 0 to 6 |
| F$_2$ | — | 0 to 1 |

Next, glass short fibers with an average diameter of 0.7 μm and an average length of about 3 mm, and the produced scaly particles with an average particle diameter of 20 μm and an average thickness of 0.4 μm were mixed so as to contain 40 vol. % of the glass fibers and 60 vol. % of the scaly particles. The obtained fibers were loosened, placed into a pulper to be further mixed uniformly with the scaly particles, sufficiently dissociated in an aqueous solution with the pH adjusted to 2.5 by sulfuric acid, and dispersed to produce slurry for papermaking (a dispersion liquid of the glass fibers and the scaly particles). A glass fiber nonwoven fabric was obtained from this slurry as a raw material by using a wet papermaking apparatus. The obtained glass fiber nonwoven fabric had a thickness of 20 μm and a basis weight of 5 g/m$^2$. A uniform binder solution was prepared as a binder by dispersing 10 g of SBR latex (solid content concentration: 3 mass %) produced by Nippon A&L Inc. in 1,000 g of water. A Separator of Example 1 was obtained by applying an appropriate amount of the binder solution by a lip coater.

The organic component in the produced separator was removed at 500° C. and its ignition loss was measured, which showed that the attachment amount of the binder was 3 parts by weight to the total weight of the separator.

The porosity of the separator and the ratio of the scaly particles obtained according to the above-mentioned equations were 90% and 60 vol. % respectively.

Figure 2:
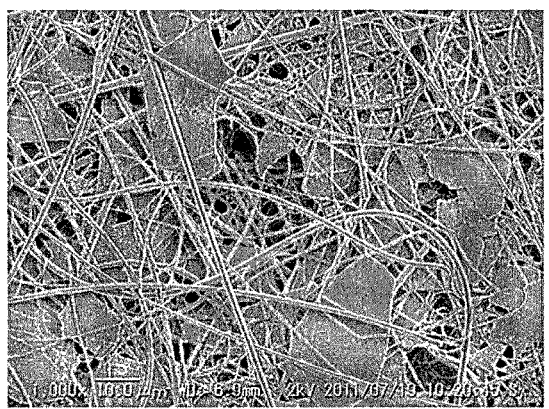
FIG. 2 is a surface SEM image of the separator in Example 1.

The surface SEM image in Example 1 is shown in FIG. 2. FIG. 2 shows that the wide-side surfaces of the scaly particles are approximately parallel to the surface of the separator.

Example 2

The glass flakes produced in Example 1 were pulverized by a ball mill to make the average particle diameter 15 μm in order to obtain scaly particles made from glass fibers, having an average particle diameter of 15 μm and an average thickness of 0.4 μm. The obtained scaly particles and glass short fibers with an average diameter of 0.7 μm and an average length of about 3 mm were mixed so as to contain 70 vol. % of the glass fibers and 30 vol. % of the scaly particles. The glass fibers were loosened, placed into a pulper to be further mixed uniformly with the scaly particles, sufficiently dissociated in an aqueous solution with the pH adjusted to 2.5 by sulfuric acid, and dispersed to produce slurry for papermaking (a dispersion liquid of the glass fibers and the scaly particles). A separator was obtained from this slurry as a raw material by using a wet papermaking apparatus.

The obtained separator had a thickness of 20 μm and a basis weight of 2.4 g/m².

The porosity of the separator and the ratio of the scaly particles obtained according to the above-mentioned equations were 95% and 30 vol. % respectively.

Example 3

The scaly particles made from glass fibers obtained in the same manner as Example 2 and glass short fibers with an average diameter of 0.7 μm and an average length of about 3 mm were mixed so as to contain 10 vol. % of the glass fibers and 90 vol. % of the scaly particles. These fibers were loosened, placed into a pulper to be further mixed uniformly with the scaly particles, sufficiently dissociated in an aqueous solution with the pH adjusted to 2.5 by sulfuric acid, and dispersed to produce slurry for papermaking (a dispersion liquid of the glass fibers and the scaly particles). A glass fiber nonwoven fabric was obtained from this slurry as a raw material by using a wet papermaking apparatus. The obtained glass fiber nonwoven fabric had a thickness of 20 μm and a basis weight of 15 g/m².

The porosity of the separator and the ratio of the scaly particles obtained according to the above-mentioned equations were 70% and 90 vol. % respectively.

Example 4

The glass flakes obtained in the same manner as Example 1 were pulverized by a ball mill to make the average particle diameter 200 μm in order to obtain scaly particles made from glass fibers, having an average particle diameter of 200 μm and an average thickness of 0.4 μm. These scaly particles and glass short fibers with an average diameter of 0.7 μm and an average length of about 3 mm were mixed so as to contain 50 vol. % of the glass fibers and 50 vol. % of the scaly particles. These fibers were loosened, placed into a pulper to be further mixed uniformly with the scaly particles, sufficiently dissociated in an aqueous solution with the pH adjusted to 2.5 by sulfuric acid, and dispersed to produce slurry for papermaking (a dispersion liquid of the glass fibers and the scaly particles). A separator was obtained from this slurry as a raw material by using a wet papermaking apparatus.

The obtained separator had a thickness of 20 μm and a basis weight of 8 g/m².

The porosity of the separator and the ratio of the scaly particles obtained according to the above-mentioned equations were 84% and 50 vol. % respectively.

Comparative Example 1

200 g of water slurry (solid content concentration: 15 mass %; the aspect ratio of contained scaly particles: 50; an average particle diameter: 0.5 μm; thickness: 0.4 μm) of silica ("Sunlovely" produced by Asahi Glass), 1,000 g of silica (an average particle diameter: 3 μm) which is inorganic particles, 108 g of SBR latex (solid content concentration: 3 mass %) which is a binder, and 1,000 g of water were put in a vessel, stirred for 1 hour by a stirrer, and dispersed to obtain uniform slurry. A nonwoven fabric made from PET and having a thickness of 15 μm was dipped into the slurry to apply the slurry to the nonwoven fabric, and the nonwoven fabric was dried to obtain a separator of Comparative Example 1 having a thickness of 20 μm.

With respect to this separator, the porosity in the separator and the volume content of the scaly particles were 58% and 2.0% respectively, which were obtained by calculation when the specific gravity of the scaly particles and silica which is inorganic particles was 2.2 g/cm³, the specific gravity of the binder was 1 g/cm³, and the specific gravity of PET in the nonwoven fabric made from PET was 1.38 g/cm³.

Comparative Example 2

The scaly particles made from glass, produced in Example 2, and glass short fibers with an average diameter of 0.7 μm and an average length of about 3 mm were mixed so as to contain 80 vol. % of the glass fibers and 20 vol. % of the scaly particles. These fibers were loosened, placed into a pulper to be further mixed uniformly with the scaly particles, sufficiently dissociated in an aqueous solution with the pH adjusted to 2.5 by sulfuric acid, and dispersed to produce slurry for papermaking (a dispersion liquid of the glass fibers and the scaly particles). A separator of Comparative Example 2 was obtained from this slurry as a raw material by using a wet papermaking apparatus.

This separator had a thickness of 20 μm and a basis weight of 3 g/m². The porosity of the separator and the ratio of the scaly particles obtained according to the above-mentioned equations were 97% and 20 vol. % respectively.

Comparative Example 3

The scaly particles made from glass, produced in Example 2, and glass short fibers with an average diameter of 0.7 μm and an average length of about 3 mm were mixed so as to contain 5 vol. % of the glass short fibers and 95 vol. % of the scaly particles made from glass. These fibers were loosened, placed into a pulper to be further mixed uniformly with the glass flakes, sufficiently dissociated in an aqueous solution with the pH adjusted to 2.5 by sulfuric acid, and dispersed to produce slurry for papermaking (a dispersion liquid of the glass fibers and the glass flakes). A separator of Comparative Example 3 was obtained from this slurry as a raw material by using a wet papermaking apparatus.

This separator had a thickness of 20 μm and a basis weight of 20 g/m².

The porosity of the separator and the ratio of the scaly particles obtained according to the above-mentioned equations were 50% and 95 vol. % respectively.

Comparative Example 4

The scaly particles made from glass, having an average particle diameter of 500 μm and a thickness of 0.4 μm, which were obtained by pulverizing, in a mortar, the glass flakes produced in Example 1, and glass short fibers with an average diameter of 0.7 μm and an average length of about 3 mm were mixed so as to contain 50 vol. % of the glass fibers and 50 vol. % of the glass flakes. These fibers were loosened, placed into a stirrer to be further mixed uniformly with the glass flakes, sufficiently dissociated in an aqueous solution with the pH adjusted to 2.5 by sulfuric acid, and dispersed to produce slurry for papermaking (a dispersion liquid of the glass fibers and the scaly particles). A separator of Comparative Example 4 was obtained from this slurry as a raw material by using a wet papermaking apparatus.

The surface of the separator had protruded scaly particles and was an excessively uneven state to such an extent that it was difficult to measure the thickness.

Puncture resistance and a value of resistance in the above-explained Examples and Comparative Examples are shown in Table 2.

its handling. Although the fibrous materials were arranged among the scaly particles, the strength as a separator could not be maintained due to the porosity of 95% or more, which showed that it was inappropriate to practical use.

In Comparative Example 3, puncture resistance was strong because of the fibrous materials arranged among the scaly particles. However, resistance was high because porosity was low due to the ratio of the scaly particles being 90 vol. % or more, and also because path-length for passing ions became long.

In Comparative Example 4, the scaly particles, which were arranged at angles to the surface direction of the separator, were largely protruded because the average particle diameter of the scaly particles was 200 μm or more, and it was therefore proved to be inappropriate as a separator.

INDUSTRIAL APPLICABILITY

The separator of the present invention can be broadly used as a separator for a nonaqueous electrolyte battery regardless of a primary battery and a secondary battery.

TABLE 2

| | Fibrous materials | | | Scaly particles | | | Binder | Separator | | | | |
|---|---|---|---|---|---|---|---|---|---|---|---|---|
| | Average diameter (μm) | Average length (mm) | Volume ratio (%) | Average particle diameter (μm) | Thickness (μm) | Volume ratio (%) | Addition amount (Parts by weight) | Basis weight (g/m²) | Thickness (μm) | Porosity (%) | Puncture resistance (kgf) | Value of resistance (Ω) |
| Ex. 1 | 0.7 | 3 | 40 | 20 | 0.4 | 60 | 3.0 | 5.0 | 20 | 90 | 3.1 | 1.5 |
| Ex. 2 | 0.7 | 3 | 70 | 15 | 0.4 | 30 | 0.0 | 2.4 | 20 | 95 | 2.4 | 1.1 |
| Ex. 3 | 0.7 | 3 | 10 | 15 | 0.4 | 90 | 0.0 | 15.0 | 20 | 70 | 3.6 | 1.8 |
| Ex. 4 | 0.7 | 3 | 50 | 200 | 0.4 | 50 | 0.0 | 8.0 | 20 | 84 | 2.8 | 1.4 |
| Com. Ex. 1 | — | — | — | 0.5 | 0.1 | 2.0 | 8.0 | 15.8 | 20 | 58 | 0.8 | 7.1 |
| Com. Ex. 2 | 0.7 | 3 | 80 | 15 | 0.4 | 20 | 0.0 | 1.7 | 20 | 97 | — | — |
| Com. Ex. 3 | 0.7 | 3 | 5 | 15 | 0.4 | 95 | 0.0 | 25.0 | 20 | 50 | 3.8 | 23.3 |
| Com. Ex. 4 | 0.7 | 3 | 50 | 500 | 0.4 | 50 | 0.0 | — | — | — | — | — |

Example 1 proves the achievement of high puncture resistance and low resistance by arranging the fibrous materials among the scaly particles with an average particle diameter of 15 μm or more and making the porosity 90% in comparison with Comparative Example 1.

Example 2 proves the achievement of high puncture resistance and low resistance while keeping strength as a separator by making the porosity 95% or less in comparison with Comparative Example 2.

Example 3 proves that low resistance can be maintained along with the achievement of high puncture resistance by making the porosity 70% or more in comparison with Comparative Example 3.

Example 4 proves that the function of a separator with less unevenness on its surface can be exhibited by using the scaly particles with an average particle diameter of 200 μm or less in comparison with Comparative Example 4.

In Comparative Example 1, resistance increased because the scaly particles were contained in the pores of the sheet-like material including the fibrous materials so as to have the porosity of 58%. Puncture resistance was also proved to be weak because the scaly particles had an average particle diameter of 15 μm or less and a volume content of 30% or less.

In Comparative Example 2, it was difficult to measure puncture resistance, resistance, and the like due to the extremely weak strength as a separator and the difficulty in

DESCRIPTION OF THE REFERENCE NUMERAL

1 Fibrous materials
2 Scaly particles

What is claimed is:

1. A separator for a non-aqueous electrolyte battery, comprising:
   scaly particles having flat surfaces;
   wherein the scaly particles are substances derived from mineral resources selected from the group consisting of glass, SiO2, Al2O3, TiO2, BaTiO2, ZrO2, alumina-silica compound oxide, oxide mica, and artificial materials thereof; and
   fibrous materials, wherein the fibrous materials are inorganic materials,
   wherein the flat surfaces of the scaly particles are oriented in the extending direction of the surface of the separator, the scaly particles being arranged in layers in the thickness direction of the separator,
   wherein the fibrous materials are interposed among the scaly particles,
   wherein the fibrous materials have an aspect ratio of length in the longitudinal direction over diameter of at least 10,
   wherein the average particle diameter of the scaly particles is 15 μm or more and 200 μm or less, wherein the porosity of the separator is 70% or more and 95% or less, wherein VC (%)={1−W/t×Σ(cM/ρM)}×100, where VC is the value of the porosity of the separator, W is the mass per unit area of the separator, t is the thickness of a sample, ρM is each density of the scaly particles, the fibrous materials, the binder, or the like, and cM is the mass ratio of ach of the solids thereof, wherein the amount of the scaly particles in the separator is 30 vol. % or more and 90 vol. % or less to the total volume of components, including binder, in the separator, and wherein VF (%)=(cF1/ρF1)/{cF1/ρF1+cF2/ρF2+Σ(cP/ρP)}×100, where VF is the volume ratio of the scaly particles, cF1 is the mass ratio of the solids of the scaly particles, ρF1 is the density of the scaly particles, cF2 is the mass ratio the fibrous materials, ρF2 is the density of the fibrous materials, ρP is the true density of each of other resin fiber and particulate substance except the binder, and cP is the mass ratio thereof.

2. The separator for a non-aqueous electrolyte battery according to claim 1, wherein the fibrous materials are glass fibers.

3. The separator for a non-aqueous electrolyte battery according to claim 1, wherein the wide side of the flat surfaces of the scaly particles are oriented within a range of ±5 degrees based on the extending direction of the surface of the separator.

4. The separator for a non-aqueous electrolyte battery according to claim 1, wherein the amount of the fibrous materials in the separator is 10 vol. % or more and 70 vol. % or less to the total volume of components in the separator.

5. The separator for a non-aqueous electrolyte battery according to claim 1, wherein the diameter of the fibrous materials is 0.1 μm or more and 5 μm or less.

6. The separator for a non-aqueous electrolyte battery according to claim 1, wherein the scaly particles are arranged to overlap with one another in part of the flat surfaces.

7. The separator for a non-aqueous electrolyte battery according to claim 1, wherein pores directed from one surface of the scaly particles to another surface in the separator are in a bent form.

* * * * *